Figure 4:
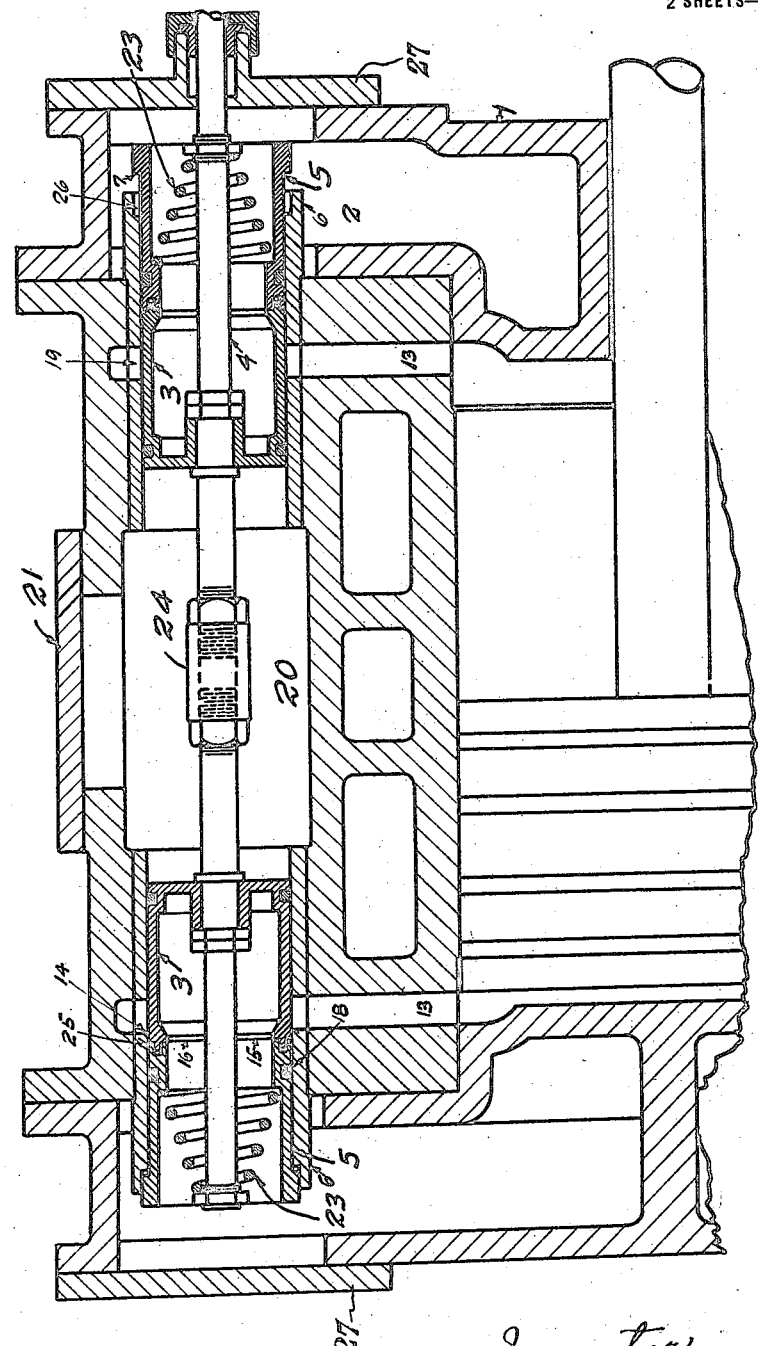

LE GRAND SKINNER.
VALVE.
APPLICATION FILED MAR. 3, 1920.
1,419,474.
Patented June 13, 1922.
2 SHEETS—SHEET 1.
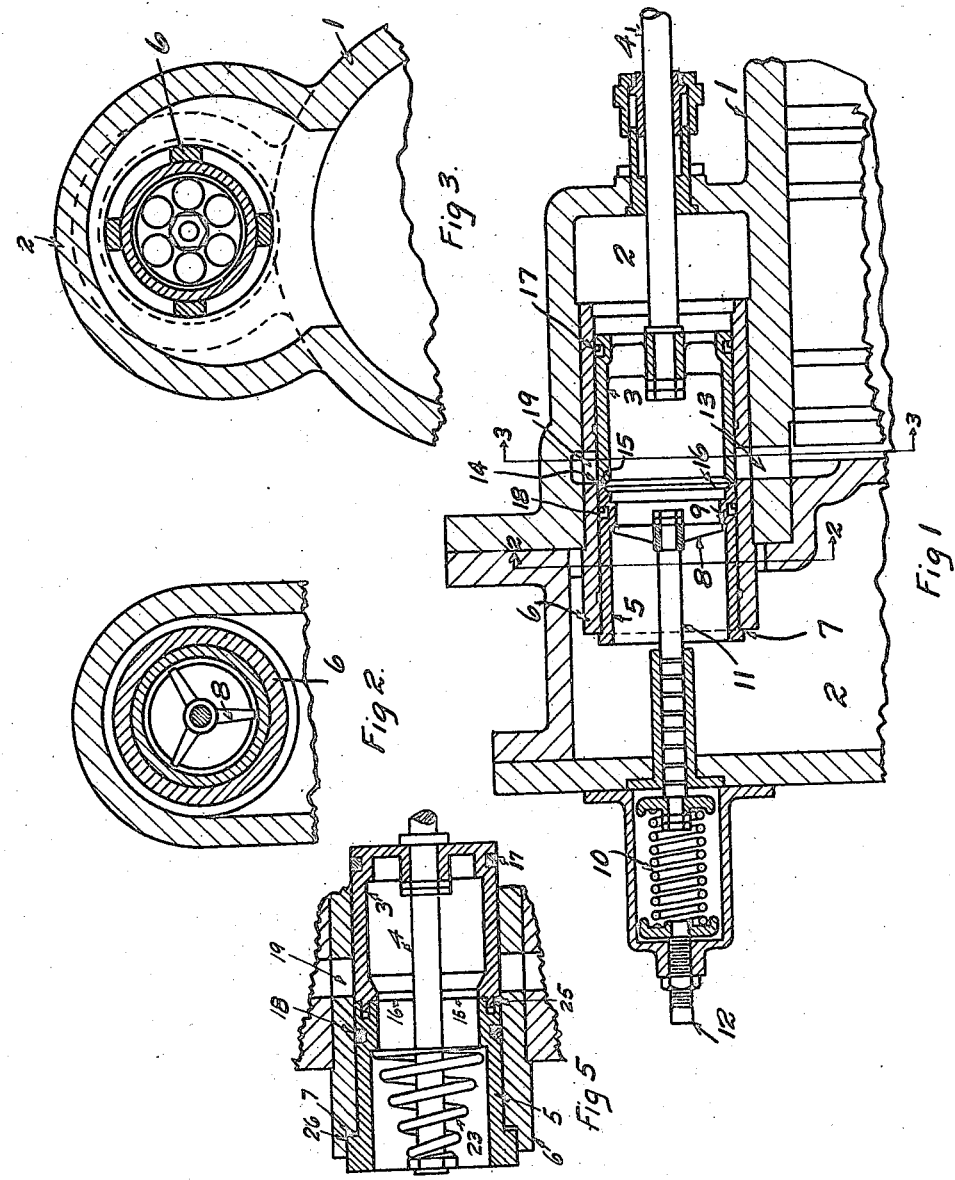
Inventor
Le Grand Skinner
By W. L. ...
atty

UNITED STATES PATENT OFFICE.

LE GRAND SKINNER, OF ERIE, PENNSYLVANIA.

VALVE.

1,419,474.  Specification of Letters Patent.  Patented June 13, 1922.

Application filed March 3, 1920. Serial No. 363,070.

*To all whom it may concern:*

Be it known that I, LE GRAND SKINNER, a citizen of the United States, residing at Erie, in the county of Erie and State of Pennsylvania, have invented new and useful Improvements in Valves, of which the following is a specification.

This invention relates to valves and is a combination of the sliding piston valve with a yielding end seat.

It is a well-known fact to steam engineers that the piston valve will not maintain steam-tightness. Naturally the hole or cage which surrounds the valve will wear large while the valve itself will wear small, so that steam leaks past the valve with resultant loss in economy.

Attempts have been made to lessen this leakage of piston valves by installing rings in the valves. This is usually done in connection with a bushing surrounding the valve, which bushing has holes in it at the cylinder ports to allow the entrance of steam when these holes are uncovered.

It has been demonstrated, however, that this did not prevent steam leakage past the valve, and it was found that the bushing was worn the greatest at that section that contained the holes to allow the entrance or egress of the steam. This was due to the fact that the bushing had less supporting area for the rings to bear against at the point that contained the holes, and the rings therefore exerted a greater pressure per square inch of the remaining supporting area of the bushing than they did at the other part of the bushing which had a solid or continuous circumference.

Partially balanced valves have been used for moderate steam pressure and moderate steam pressure conditions. These valves, it has been proved, will maintain their initial steam-tightness for many years because the valve is always working with a pressure exerted against it and operating to hold it against the valve seat.

However, such a valve has its limitations in regard to steam pressure and steam temperature conditions and cannot be used with success for high pressures or high temperatures.

The poppet valve, as ordinarily constructed, will maintain a nearer degree of steam-tightness under high steam pressure and temperature conditions than will the piston valve; but the solid two-seated poppet valve will also leak steam when the steam temperatures vary, the valve expanding and contracting differently than the valve seats in the engine cylinder, so that only one valve seat is in contact with one cylinder seat.

Single seated poppet valves are not practical because they are not balanced and would require excessive power to operate.

The poppet valve shown in my Patent #13768 reissued July 7, 1914 is a two-seated poppet valve designed to compensate for the difference in the expansion and contraction of the valve and the valve seats in the cylinder but such a valve is expensive to manufacture and, of course, cannot be operated at higher speeds than any other form of double-seated poppet valve.

The invention is illustrated in the accompanying drawings as follows:—

Fig. 1 shows a vertical central section through a valve arranged in a steam engine cylinder.

Fig. 2 a section on the line 2—2 in Fig. 1.

Fig. 3 a section on the line 3—3 in Fig. 1.

Fig. 4 a central vertical section of connected valves arranged on a steam engine cylinder.

Fig. 5 is an enlarged view showing the details of cushion pockets for cushioning the contact of the valve parts.

1 is a cylinder casing, 2 a valve chest, said valve chest extending into the head and in consequence forming a steam-heated head on the cylinder, 3 one element of my piston poppet valve which is connected to a valve rod 4 and operated by any approved means such as by an eccentric or a cam attached to the engine shaft or governor.

5 is the yielding seat for the valve 3 both the yielding seat and the valve being mounted preferably in a bushing 6 attached to the steam chest 2. It will be seen that the yielding seat 5 is slidably mounted in the bushing 6.

A shoulder 7 is provided on the yielding seat 5 to limit the movement of the yielding seat in a direction toward the right as shown in Fig. 1.

A spider 8 is provided which presses against a shoulder 9 on the yielding seat 5 and by reason of a spring 10 exerting a pressure on the stem 11 which is attached to the spider 8 exerts a pressure against the yielding seat 5 to press the same to the position shown in Fig. 1. The amount of tension on the spring 10 can be varied by means of a set screw 12.

The operation of this valve is as follows: The valve gear attached to the engine operates the valve 3 to the right opening the cylinder inlet port 13. The valve 3 separates from the yielding seat 5 and allows the steam from the steam chest chamber 2 to pass both the valve 3 and the yielding seat 5 and thence into the cylinder port 13. After the valve 3 is moved to the right a sufficient distance, depending on the throw of the eccentric or the position of the governor mechanism, it reverses its travel, and as soon as it has crossed the edge 14 of the port 13, cut-off has taken place and no more steam is admitted to the cylinder providing no steam leaks past the short space between the edge 14 and the seat 15 of the valve 3.

However, there would probably be some leakage, and therefore, the valve is required to travel beyond and strike the yielding seat 5 at its seating surface 16 making steam-tight contact with the same. The yielding seat 5 is forced somewhat toward the left against the tension exerted by the spring 10.

If the valve 3 is connected to the engine by means of the usual automatic shaft governor, it will have variable travel and it will force the yielding seat 5 to the left a distance depending on the load on the engine, which load governs the amount of travel such a connected valve has.

On poppet valve engines it has been usual and almost necessary to operate them with cams so that the cam could retard the movement of the valve about the time it was to strike the valve seat. Such a valve could not well be operated by the ordinary shaft governor without the use of cams, whereas my valve can be connected to any shaft governor designed to operate the ordinary piston, pressure-plate or other sliding valves, and without the necessity of cams.

As shown the yielding seat 5 is slightly unbalanced which would tend to keep it in extreme rightward position as shown in Fig. 1, but the spring 10 is also used to exert a pressure in the same direction as the preponderance of pressure to overcome any friction which may exist.

The valve 3 is provided with a packing ring 17 but this ring does not ever travel across the port 13 as in the ordinary piston valve. Therefore, the wear on the ring is even and the wear on the bushing is even and this ring should stay tight for a very long period of time, which, as has been stated above, cannot be expected in a piston valve having rings that travel across the port.

In like manner, the yielding seat 5 is equipped with packing rings 18 which do not travel across any ports. Therefore, steam cannot leak from the chest 2 into the port 13 between the yielding seat 5 and the bushing 6 or between the valve 3 and the bushing 6. The bushing 6 is preferably built with holes of sufficient area at the port 13 to allow the entrance of steam into the cylinder. The ports 13 are carried into the bushing through openings 19.

The construction shown in Fig. 1 is of a single valve for controlling one end of a cylinder.

Fig. 4 shows a modified form where two valves, one controlling each end of a steam cylinder are used. It will be noted that the valves 3—3 are not provided with spider connections to the valve stem as in Fig. 1. While such elimination of the spider is preferable it is not necessary. The construction shown here is designed to prevent any steam from getting into the space 20 but the invention is not so limited. I prefer to provide the head with a removable cover plate 27 in alinement with the casing so as to permit the ready insertion and removal of the valve and the seats.

By way of variation springs 23—23 are shown in the interior of the yielding seat 5 instead of placing a spring on the outside of the valve chest, as shown in Fig. 1. Further the springs are enclosed in the valve rod.

Adjustment is provided at 24 consisting of a nut with right and left hand threads connecting to valve stems so that the valves can be adjusted with proper relation to each other. To effect this adjustment, the plate 21 can be removed, or, if desirable the plate 21 may be eliminated entirely.

I do not limit myself to a valve for steam engines but this valve may be used for many purposes including gas engines, air compressors, ammonia compressors and other power-producing or power-driven units utilizing any gas or fluid.

It may be desirable under certain conditions to cushion the impact between the valve member and the sliding member so as to lessen the noise of impact. I have shown in Figs. 4 and 5 a preferable way in which this may be accomplished. The valve member 3 has an annular projecting ring or tongue 25 which projects into an annular groove in the seating member 5. As the valve starts to close and before the actual impact has been made the tongue 25 must enter the annular groove or cushioning pocket in the seating member and with a small running clearance this will form a cushion of vapor or steam which is intended to start the seating member in the direction of the valve movement before the actual impact has taken place. This tongue and groove formation on the seating face also effects a more complete seal than would be possible with a plane surface. The tongue 25 is somewhat exaggerated in order to indicate its construction.

It may also be desirable to cushion the seating member 5 so that on the return stroke of the valve the shoulder 7 will not strike directly on the end of the bushing or case 6 with great force. A cushion pocket 26 is provided by recessing the end of the casing a sufficient amount to admit the shoulder 7 in the pocket. In this way a certain amount of vapor or steam is trapped in the pocket and allows the cushioning effect. It will be understood that the fit is not so tight but that the leakage will permit the sliding seat to move sufficiently to permit the shoulder 7 to positively engage the bottom of the pocket.

I do not limit my construction to having the casing separately mounted in the steam chest as shown.

What I claim as new is:—

1. In a valve, the combination of a valve case having a port therethrough; a seat slidingly mounted in the case and making a closure with the walls of the case; and a valve slidingly mounted in the case and making a closure with the walls thereof with which the valve is in sliding contact and with the seat when in contact, said valve and seat seating one on the other and moving together with a closed port and separating to open the port.

2. In a valve, the combination of a valve case having a port therethrough; a yielding seat in the case at one side of the port and making a closure with the walls of the case; a valve slidingly mounted in the case and making a closure with the walls of the case with which the valve is in sliding contact and the yielding seat when in contact; and means for moving the valve across the port and into contact with the yielding seat and then with the seat.

3. In a valve, the combination of a valve case having a port therethrough; a seat slidingly mounted in the case; a stop for limiting the movement of the seat to one side of the port; means for exerting pressure on the seat for moving it toward the stop; and a valve slidingly mounted in the case and making a closure with the walls of the case with which it is in sliding contact and adapted to move over the port and into closure contact with the seat, the movement of the valve forcing the seat from the stop.

4. In a valve, the combination of a valve case having a port therethrough; a seat slidingly mounted in the case; a stop for limiting the movement of the seat at one side of the port; a spring yieldingly pressing said seat against the stop; and a valve slidingly mounted in the case and making a closure with the walls of the case with which it is in sliding contact and adapted to move over the port into closure contact with the seat, the movement of the valve forcing the seat from the stop.

5. In a valve, the combination of a valve case having a port therethrough; a seat slidably mounted in the case; a valve slidingly mounted in the case and making a closure with the walls of the case with which it is in sliding contact and operating over said port and making a closure with the seat when in contact; and a packing ring on the valve and making a closure between the valve and the case, said valve and seat seating on one another with the port closed and separating to open the port while maintaining the ring on one side of the port.

6. In a valve, the combination of a valve case having a port therethrough; a seat slidingly mounted in the case and making a closure with the walls of the case with which it is in sliding contact and operating over said port; a packing ring making a closure between the seat and the walls of the case; a valve slidingly mounted in the case and making a closure with the seat when in contact; and a packing ring on the valve and making a closure between the valve and case; said valve and seat seating on one another with the port closed and separating to open the port while maintaining the rings at opposite sides of the port.

7. In a valve, the combination of a valve case having a port therethrough; a seat slidingly mounted in the case and having a shoulder engaging the end of the case to limit the movement of the seat toward the port; and a valve slidingly mounted in the case and making a closure with the walls thereof with which the valve is in sliding contact, said valve and seat seating on one another with the port closed and separating to open the port and the movement of the valve moving the seat away from the port.

8. In a steam engine, the combination of a cylinder having a port leading thereto; a valve case having its axis parallel to the axis of the cylinder and into which said port leads; a seat slidingly mounted in the case and making a closure with the walls of the case; and a valve slidingly mounted in the case and making a closure with the walls thereof with which the valve is in sliding contact and with the seat when in contact, said valve and seat seating one on the other and moving together with a closed port and separating to open the port.

9. In a steam engine, the combination of a cylinder having ports leading to the opposite ends thereof; valve cases having their axes in alinement and parallel to the axis of the cylinder to which said ports lead; seats slidingly mounted in said cases and forming closures with the walls thereof with which the valve is in sliding contact; valves slidingly mounted in said cases and forming closures with the walls thereof and with the companion seats when in contact, each pair of valves and seats seating on one another with their port closed and separating to open their port; and means connecting the valves.

10. In a steam engine, the combination of a cylinder having ports leading to the opposite ends thereof; valve cases having their axes in alinement and parallel to the axis of the cylinder to which said ports lead; seats slidingly mounted in said cases and forming closures with the walls thereof; valves slidingly mounted in said cases and forming closures with the walls thereof and with the companion seats when in contact, each pair of valves and seats seating on one another with their port closed and separating to open their port; means connecting the valves; and means for adjusting the connection to adjust the valves.

11. In a steam engine, the combination of a cylinder having ports leading to the opposite ends thereof; valve cases having their axes in alinement and parallel to the axis of the cylinder to which said ports lead; seats slidingly mounted in said cases and forming closures with the walls thereof; valves slidingly mounted in said cases and forming closures with the walls thereof with which the valve is in sliding contact and with the companion seats when in contact, each pair of valves and seats seating on one another with their port closed and separating to open their port; means connecting the valves; and stops limiting the movement of the seats toward their ports.

12. In a steam engine, the combination of a cylinder having ports leading to the opposite ends thereof; valve cases having their axes in alinement and parallel to the axis of the cylinder to which said ports lead; seats slidingly mounted in said cases and forming closures with the walls thereof; valves slidingly mounted in said cases and forming closures with the walls thereof with which the valve is in sliding contact and with the companion seats when in contact, each pair of valves and seats seating on one another with their port closed and separating to open their port; means connecting the valves; stops limiting the movement of the seats toward their ports; and springs pressing the seats to move them toward their stops.

13. In a steam engine, the combination of a cylinder having a port leading therefrom; a head on the cylinder having a steam chest therein; a valve case through the walls of which the port leads and through the end of which the chest communicates; a seat slidingly mounted in the case and making a closure with the walls thereof; and a valve slidingly mounted in the case and making a closure with the walls thereof and with the seat when in contact, said valve and seat seating one on the other and moving together with a closed port and separating to open the port.

14. In a steam engine, the combination of a cylinder having a port leading therefrom; a head on the cylinder having a steam chest therein; a valve case through the walls of which the port leads and through the end of which the chest communicates; a seat slidingly mounted in the case and making a closure with the walls thereof; and a valve slidingly mounted in the case and making a closure with the walls thereof and with the seat when in contact, said valve and seat seating one on the other and moving together with a closed port and separating to open the port and said head having openings opposite the valve case to afford access to said case.

15. In a valve, the combination of a valve case having a port therethrough; a seat slidingly mounted in the case and making a closure with the walls of the case; a stop limiting the movement of the sliding seat; a cushion pocket between the stop and the sliding seat; and a valve slidingly mounted in the case and making a closure with the walls thereof and with the seat when in contact, said valve and seat seating one on the other and moving together with a closed port and separating to open the port.

16. In a valve, the combination of a valve case having a port therethrough; a seat slidingly mounted in the case and making a closure with the walls of the case; and a valve slidingly mounted in the case and making a closure with the walls thereof and with the seat when in contact, said valve and seat seating one on the other and moving together with a closed port and separating to open the port, the contact faces of the seat having a cushioning pocket and projection for cushioning the seating action of the valve on the seat.

17. In a valve, the combination of a valve case having a port therethrough; a seat slidingly mounted in the case and making a closure with the walls of the case; a stop limiting the movement of the sliding seat; a cushion pocket between the stop and the sliding seat; and a valve slidingly mounted in the case and making a closure with the walls thereof and with the seat when in contact, said valve and seat seating one on the other and moving together with a closed port and separating to open the port, the contact faces of the seat and valve having a cushioning pocket and projection for cushioning the seating action of the valve on the seat.

18. In a valve, the combination of a valve case having a port therethrough; a seat slidingly mounted in the case and making a closure with the walls of the case; and a valve slidingly mounted in the case and making a closure with the walls thereof and with the seat when in contact, said valve and seat seating one on the other and moving together with a closed port and separating to open the port, the contact faces of the valve and seat having an annular groove and tongue forming a cushioning pocket and seal for the face.

19. In a steam engine, the combination of a cylinder; a valve case in communication with the cylinder and having two ports therein separated axially of the valve case; yielding seats slidingly mounted in said case and forming closures with the walls thereof; and a valve slidingly mounted in the case and forming a closure with the walls thereof, one end of the valve operating over one of said ports and the other end of said valve operating over the other of said ports, the ends of said valves seating on said yielding seats, said valve forming a closure with the walls of the case with which it makes a sliding contact.

20. In a steam engine, the combination of a cylinder; a valve case in communication with the cylinder and having two ports therein separated axially of the valve case; yielding seats slidingly mounted in the outer ends of said case and forming closures with the walls thereof; and a valve slidingly mounted in the case and arranged between the seats and forming a closure with the walls thereof, one end of the valve operating over one of said ports and the other end of said valve operating over the other of said ports, the ends of said valves seating on said yielding seats, said valve forming a closure with the walls of the case with which it makes a sliding contact.

In testimony whereof I have hereunto set my hand.

LE GRAND SKINNER.